(No Model.)  2 Sheets—Sheet 1.

M. L. SEVERY.
APPARATUS FOR GENERATING ELECTRICITY BY SOLAR HEAT.

No. 527,379. Patented Oct. 9, 1894.

Witnesses.
Arthur C. Mudge
J. H. Robinson

Inventor.
Melvin L. Severy.
by Howe & Kellogg
att.

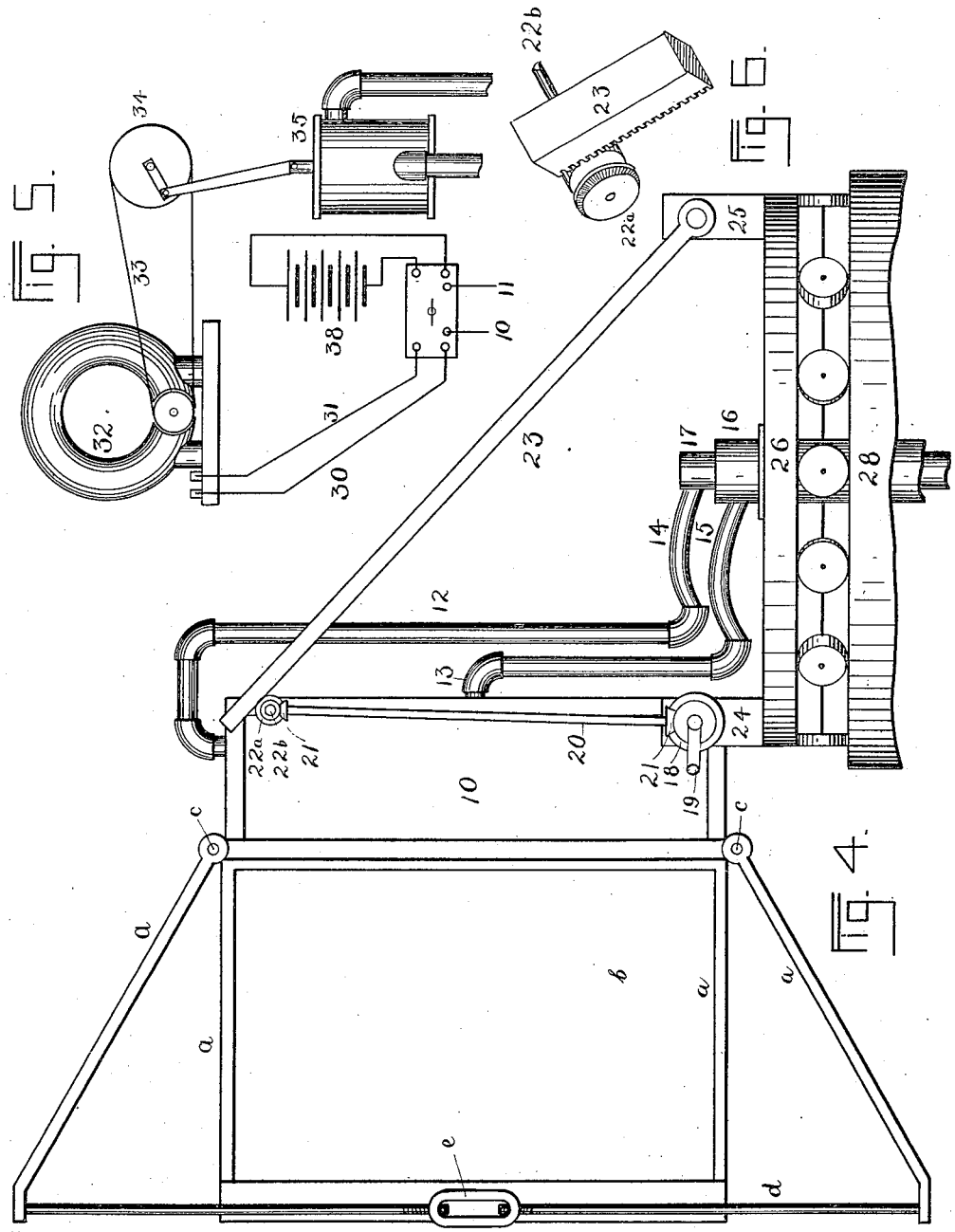

UNITED STATES PATENT OFFICE.

MELVIN L. SEVERY, OF BOSTON, ASSIGNOR OF ONE-HALF TO FRANCIS DOANE, OF NORWOOD, MASSACHUSETTS.

APPARATUS FOR GENERATING ELECTRICITY BY SOLAR HEAT.

SPECIFICATION forming part of Letters Patent No. 527,379, dated October 9, 1894.

Application filed February 16, 1894. Serial No. 500,387. (No model.)

*To all whom it may concern:*

Be it known that I, MELVIN L. SEVERY, a citizen of the United States, residing in Boston, in the county of Suffolk, and State of Massachusetts, have invented certain new and useful Improvements in Apparatus for Generating Electricity by Solar Heat, of which the following, taken in connection with the accompanying drawings, is a specification.

The object of this invention is the utilization of the sun's heat for the production of electricity as a source of heat, light and power, and to this end the invention consists, first, in the combination, substantially as hereinafter more fully set forth, with a thermo-electric pile, of means for directing the heat of the sun upon the face of the pile; second, in the combination, substantially as hereinafter more fully set forth, with a thermo-electric pile, of means for directing the heat of the sun upon the face of the pile; an electric motor operated by part of the current thus generated; a pump or other device operated by said electric motor; means for supplying water or other cooling agent to cool the back of the pile, and a storage battery charged by part of the electricity generated by the pile; third, of a thermo-pile constructed substantially as hereinafter more fully set forth, composed of thin plates of dissimilar metals or alloys, whereby I am enabled to utilize in the production of electricity a greater number of the thermal units contained in the source of heat than in piles heretofore made; a distinctive feature of my invention being the employment in each pair of an element having a large superficial exposure and cross section and having an extremely low electrical resistance due to this large section and its extreme shortness in the direction of the flow of the current. Instead of taking the thermal units in high temperature and over small area, (which has necessitated long or thick elements of great resistance, — for reasons easily obvious, — ) I take them at a low temperature and over a large area, which enables me to obtain the extremely low resistance already cited, and, furthermore, this construction permits of a new and valuable use of thermo-piles, viz., as a means for utilizing the rays of the sun.

In the accompanying drawings, mechanism is shown by means of which my invention may be carried into effect.

Figure 1:
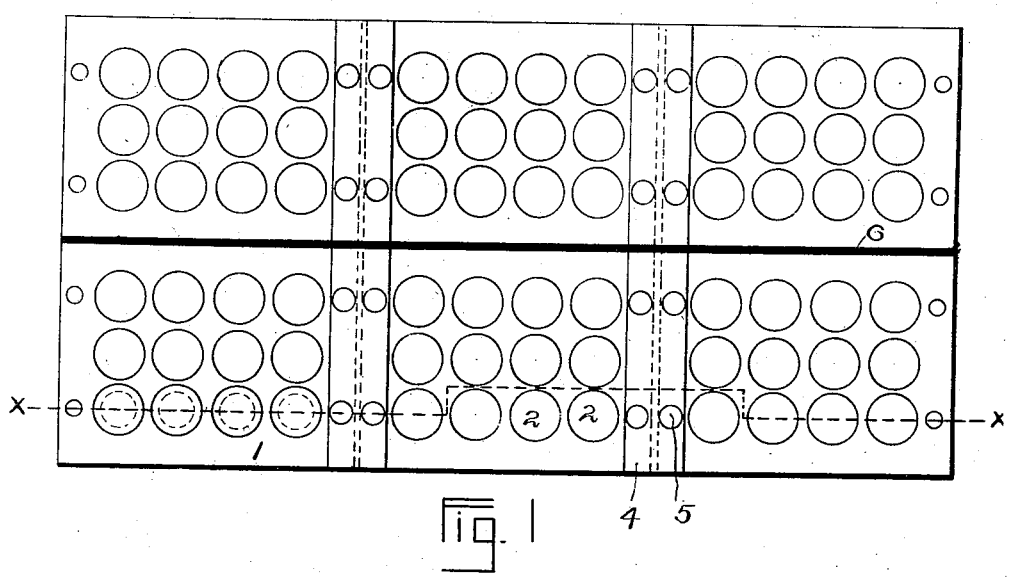
Figure 2:
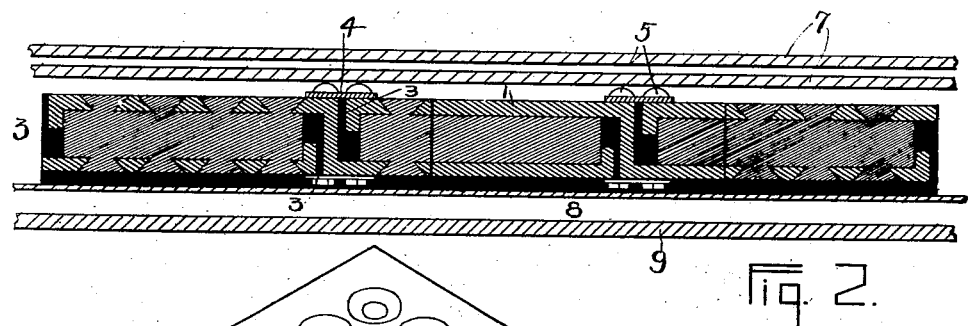
Figure 3:
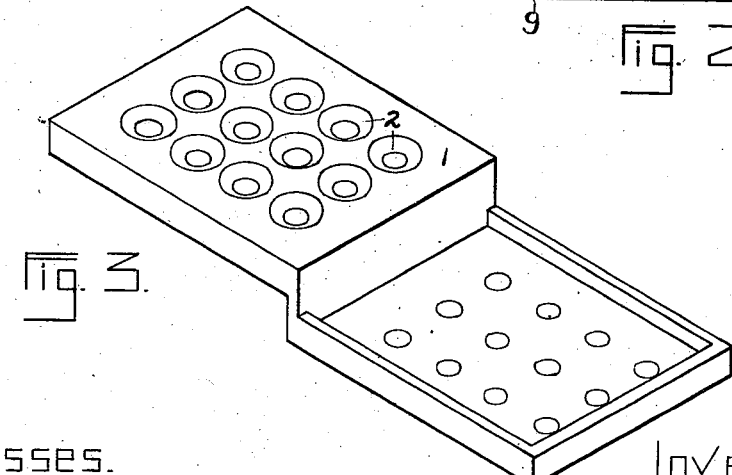

Figure 1 is a plan view of the thermo-pile. Fig. 2 is a sectional view of the same on the line X X, Fig. 1. Fig. 3 is an isometric view of one of the elements. Fig. 4 is a view in elevation of the thermo-electric pile, a means for directing the heat of the sun upon the face of the same, and mechanism for moving this directing device in accordance with the apparent diurnal movement of the sun and the varying altitude of its path during its apparent annual movement, and means for supplying water to cool the back of the pile, all combined in one machine or apparatus, which is a convenient means for utilizing my invention. Fig. 5 is a diagrammatic view of the electric motor, the pump and storage battery, with the several connections between these devices. Fig. 6 is a detail view showing a part of the rack bar and the pinion gearing with the same.

In the drawings like numerals and letters refer to like parts.

In the invention described in this application, I have shown plane reflectors for directing the heat of the sun upon the face of the pile, but in most cases I shall be able, by preventing radiation and convection, to obtain sufficient heat by the direct action of the sun's rays without any concentration of the same.

I will first describe the construction of the thermo-pile which I use in this apparatus.

It is well known that the current of electricity which is obtained from a thermo-pile results from a difference in temperature between the hot and cold poles of the elements, and in most cases one end of the bars composing the pile is exposed to the heat produced by a flame or furnace, while the other end is cooled by exposure to the air.

In the pile described in this application, the heat is diffused over an extended area, and the difference in the temperature of the hot and cold poles is relatively less, and consequently these poles may be near to one another, thereby greatly diminishing the internal resistance of the pile, and enabling a greater amount of electricity to be utilized in electrical work externally to the pile itself than in piles as heretofore constructed. Add to this the large superficial area and consequent greatness of cross section, and, since cross section and length are the factors of resistance in any given substance, the advantage of this form will be apparent. In the form shown, I accomplish this result by means of a series of flat bars composed of two plates of dissimilar metals or alloys arranged in the same plane, the said bars being arranged in a series and having the usual and necessary polar connections effected in a novel manner.

Referring to the drawings, 1 is a plate of cast iron or other suitable metal which is bent at right angles near its center in two places in opposite directions, so that two surfaces are formed lying in parallel planes, each end and the sides of the plates being provided with flanges, as shown in the drawings. In this plate are perforations —2—, those in one half of the plate being beveled in opposite directions to those in the other half. These plates are arranged end to end and overlap each other, as shown in Fig. 2. Into the space formed by these overlapping plates is poured or otherwise inserted some metal dissimilar to the metal composing the plates, so that an intimate contact is formed between the two metals. These superimposed plates are insulated from each other as shown at 3, and are bound together by means of insulated bolts —5— and transverse plates of insulation —4—. The drawings show two entire plates and one half of each of two other plates, but any number of plates may be used, and they may be of any desired length. A series of these composite plates or bars is then placed side by side and insulated from each other as shown at 6. The pile thus formed can then be connected as desired, either in series or in multiple arc.

The back of the pile is covered with a plate of insulating material, and behind this is a plate of metal —9— which is separated from the insulation, whereby a space —8— is formed for the circulation of water or other cooler for cooling the back of the pile. I prefer to cover the front of the pile with one or more plates —7— of some material which is transparent to direct solar rays, but opaque to dark radiated heat.

I have described this device as a new form of thermo-pile which I prefer to use with this apparatus, for the reason that it has a greater efficiency than any other form known, but I can use any other form of pile for carrying my invention into effect. This pile is placed in any suitable case —10— which may be mounted in any suitable manner, and in the accompanying drawings I have shown several ways of mounting said case.

In Fig. 4 the case 10 is pivoted at one end in a vertical position upon a standard —24— upon a suitable turn-table —26— which turn-table is supported by rollers upon a suitable base plate —28—. A frame for supporting reflectors is attached to the front of the case. This frame is four-sided, and each of its sides —a— forms an oblique angle with the plane of the front of the pile. In these sides may be placed detachable reflectors —b— by means of which the sun's rays may be reflected upon the face of the pile. Thus, by the simultaneous application of numerous rays of heat reflected upon the same place, it receives a greater degree of heat than it would receive from unreflected rays falling directly upon it. Each of the sides is movable upon a pivot —c— on the case, so that the angle of reflection may be varied as desired, and is detachable for those cases where the direct rays are sufficient. In order to effect this adjustment, a rod —d— is attached at one end to the inside of each of the sides, and at the other end screws into a turn-buckle —e—. By turning this turn-buckle the inclination of the sides may be varied as desired.

The object of supporting the pile upon a turn-table is to enable it to be moved in a horizontal plane. The object of supporting the pile upon a vertical standard, is to enable it to be moved in a vertical plane. By the combination of these two movements, the face of the pile can be maintained opposite to the sun at all times of the day and at all seasons of the year. It is not absolutely necessary, however, to mount the pile so as to give it the various movements above described, for it may be placed in a fixed position so as to receive the rays of the rising and setting sun at an angle and the full effects of the noon sun. Arranged in this way, the pile will not be as efficient as if mounted as hereinbefore described, but it may answer for some purposes.

The device here shown is simple and convenient. It is shown as operated by hand, but it may also be operated by automatic mechanism if desired.

The movement in a vertical plane of the pile and the device for directing the rays of the sun upon it is effected by the engagement of a pinion —22$^a$— on a horizontal shaft —22$^b$— fixed to the upper corner of the case, with an inclined rack bar —23— attached at its lower end to a standard —25— on the turn-table. This pinion is rotated from the corner of the case containing the pile, by means of a bevel gear —18— loose upon the pivot upon which the pile turns, and supported so as to turn in the center, and a rod —20— having at each end bevel gears —21— one of which engages with the bevel gear 18 and the other with the bevel gear 22. The wheel 18 is turned by the crank 19.

The electric current which is produced by a thermo-pile is due to the difference in temperature between the outer faces of the plates or bars forming the elements. It is therefore desirable to keep the rear ends of the bars as cool as possible. I effect this result by the circulation of water, air or other cooler in the open space between the rear plates or bars and the back of the case. A convenient method of accomplishing this result is by means of pipes —12 and 13— one of which is connected to the top of the case and the other at the side. The pipes 17 and 16 are two concentric hollow shafts to which these pipes 12 and 13 are respectively connected by flexible pipes —14 and 15—. The turn-table 26 turns on the outer shaft 16. Flexible connections are used on account of the movement in a vertical plane which is given to the pile and the heat reflecting devices.

The water circulating in the case for cooling the ends of the bars may be supplied by a pump, and this pump or other device for supplying water under pressure may be operated by any suitable power, but I prefer to operate it by means of a motor operated by a part of the current generated by the pile. The remainder of the current may be used directly, or it may be stored in a storage battery. It is obvious that the water used for cooling the pile may be drawn by suction as well as forced through the cool ends of the pile, and thus, in pumping water for irrigation, a refrigerating medium may be obtained without deviating the water from other uses. Any form of pump, any form of motor and any form of storage battery may be used. It is therefore unnecessary to further describe them.

In Fig. 5, 32 is the motor; 33, a belt; 34, a wheel connected to the shaft of the motor by the belt and connected to the pump 35 by a crank. 38 is the storage battery. 30 and 31 are wires to the motor and 10 and 11 are wires from the thermo-pile.

The pump which is operated by the motor may be used for irrigation or for other purposes, as the water which flows through the pile is not lost.

The area of the surface upon which it is possible to concentrate the heat of the sun is only limited by the size of the reflecting surfaces. The area of the face of the pile may also be quite extensive, and therefore a large amount of electricity may be produced.

Thermo-electric piles have not been found economical heretofore, as sources of electricity, but inasmuch as the sun's heat costs nothing, the cost of producing electricity can be greatly reduced, and the use of the thermo-electric pile made profitable.

The insulation at the back of the pile may be composed of some material which will absorb the heat from the pile, and this insulation may then be cooled by the refrigerating medium drawn through the space 8.

Having thus described my invention, what I claim, and desire to secure by Letters Patent of the United States, is—

1. In a thermo-pile, the combination of a plate of cast iron or other suitable material bent in two places, whereby two parts are formed on different planes; a similar plate having its upper end superimposed above the lower end of the first mentioned plate; a filling of some metal which is dissimilar to the metal composing said bent plates and occupying the space between said plates; insulating material placed between said plates, and means for subjecting the opposite sides of the elements thus formed to a difference of temperature substantially as shown and described.

2. In a thermo-pile, the combination of a plate of cast iron or other suitable material bent at two points to form two parts lying in different planes, a similar plate having its upper end superimposed above the lower end of the first-mentioned plate, a filling of some material which is dissimilar to that of the bent plates, and insulating material between the plates, substantially as described.

3. A thermo-pile composed of two plates or layers of dissimilar metals intimately in contact with each other divided into insulated segments of pairs and the segments connected electrically and so that they will lie in substantially the same plane, as set forth.

4. The combination, substantially as described, of a thermo-electric pile; means for directing the rays of the sun upon the face of the pile, and means for moving said pile and heat directing device in accordance with the apparent diurnal and annual movements of the sun, whereby the face of the pile is constantly maintained opposite the sun.

5. The combination, substantially as described, of a thermo-electric pile, an electric motor operated by said pile, a pump operated by said motor, and means for conveying a cooling agent from the pump to the back of the pile.

6. The combination, substantially as described, of a case containing a thermo-electric pile, in which the side opposite the front face of the pile is composed of glass or of some other material which is transparent to the rays of the sun, but opaque to dark radiated heat; a space between this front of the case and the front of the pile, and means for moving the case in accordance with the apparent diurnal and annual movements of the sun, whereby the face of the pile is constantly maintained opposite to the sun.

7. The combination, substantially as described, of a thermo-electric pile; a case containing the same having its side opposite the face of the pile composed of some material which is transparent to the rays of the sun but opaque to dark radiated heat; a space between said front wall and the face of the pile; mechanism for moving said pile in accordance with the apparent annual and diurnal movements of the sun; a space between the back wall of the case and the back of the pile; two pipes communicating at one end with this space and at the other with a source of water under pressure, whereby a current of water is caused to flow through said last mentioned space.

8. The combination, substantially as described, of a device heated by exposure to the sun's rays; a turn-table rotating horizontally upon a suitable support; a standard upon said turn-table supporting the device which is to be thus rotated; means for rotating this turn-table; a beveled gear wheel supported vertically upon said standard; means for turning said wheel; a rod carrying at one end a beveled gear at right angles to the rod and gearing with the beveled gear on the standard, and at the other end a beveled gear gearing with a beveled gear vertically supported upon a shaft; a pinion on this shaft, and an inclined rack gearing with this pinion and pivoted at one end to the turn-table opposite the standard supporting the beveled gear.

9. The combination of a case; a rotating turn-table supporting the same; two concentric hollow shafts, on the outer one of which the turn-table rotates, and the pipes connected to the case, and each connected respectively to one of the hollow shafts, and flexible connections between these pipes and the hollow shafts.

10. The combination, substantially as described, of a case containing a device to be heated by the rays of the sun; a four-sided frame having its sides set at oblique angles to the front face of the case and pivoted to the case; reflectors in the sides of this frame, and means for varying the angle of inclination of the sides of the frame.

11. A thermo-electric pile operated by solar rays and means for constantly presenting the parts thereof to be heated toward the sun from sunrise to sunset at all seasons, substantially as shown and described.

12. The combination, with a thermopile, of means for directing the rays of the sun upon one face of said pile, and means for preventing radiation of heat from said face, substantially as shown and described.

In testimony whereof I have hereunto subscribed my name this 9th day of February, A. D. 1894.

MELVIN L. SEVERY.

Witnesses:
CHAS. A. KELLOGG,
ARTHUR C. MUDGE.